United States Patent

[11] 3,579,100

| [72] | Inventor | Palmer R. Lauver<br>416 N. Second St., Sunbury, Pa. 17801 |
|---|---|---|
| [21] | Appl. No. | 824,528 |
| [22] | Filed | May 14, 1969 |
| [45] | Patented | May 18, 1971 |

[54] FLASHLIGHT ADAPTED FOR SHORT CIRCUIT TESTING
4 Claims, 2 Drawing Figs.

| [52] | U.S. Cl. | 324/58 |
|---|---|---|
| [51] | Int. Cl. | G01r 31/02 |
| [50] | Field of Search | 324/51, 52, 53, 66 |

[56] References Cited
UNITED STATES PATENTS
3,317,825   5/1967   Huff ........................... 324/66X FOREIGN PATENTS
995,752   12/1951   France ........................ 324/53
807,544   1/1959   Great Britain ............... 324/51

Primary Examiner—Gerard R. Strecker
Attorney—Paul & Paul

ABSTRACT: An apparatus is disclosed comprising a flashlight having two bulbs at the light-emitting end, and equipped with a three-pronged adapter at the rearward end. The two bulbs are wired through the batteries and a two position switch such that a short circuit between any pair of terminals of a three-terminal socket is detected by a specific pattern of energized bulbs.

Patented May 18, 1971 3,579,100

INVENTOR.
PALMER R. LAUVER
BY Paul & Paul
ATTORNEYS.

FLASHLIGHT ADAPTED FOR SHORT CIRCUIT TESTING

BACKGROUND OF THE INVENTION

1. Field of the Invention

This invention lies in the area of flashlight testers, and more particularly in the area of portable flashlight continuity testers.

2. Description of the Prior Art

In the construction industry and in other areas of electrical installation and repair work, there is a great need for a quick and efficient means of making continuity tests of circuits which have been installed. Not frequently there is a hidden contact of two or more wires connected to the terminals of a wall outlet, thus producing a short circuit which must be detected and corrected before power is first coupled to the system. In many industries, such as in the mobile home or trailer industry, the electrician commonly carries a flashlight, and would be burdened by the requirement of carrying an additional continuity meter. Further, it is advantageous to have a measuring instrument which plugs directly into the socket to be tested, without any loose hanging wires.

SUMMARY OF THE INVENTION

The primary object of my invention is to provide an apparatus for making continuity tests of installed electrical wiring circuits which is simple, convenient, lightweight, inexpensive and effective for the purpose and which overcomes the disadvantages of the prior art.

It is a further object of my invention to provide an apparatus which operates as a conventional flashlight and which incorporates two bulbs, so that a plurality of terminal pairs can be continuity tested by switching the apparatus.

It is a further object of my invention to provide an apparatus for making continuity tests which can be plugged directly into a wall socket.

Accordingly, this invention provides a novel and effective apparatus for making continuity tests on installed wiring which incorporates two lights into a conventional flashlight, a three-pronged adapter at the rearward of said flashlight for ready insertion into three-terminal wall sockets, and a two-position switch to provide the proper circuit connection for a continuity test of any terminal pair of such three-terminal circuit.

In operation, the short circuit testing device is inserted into a standard three-hole wall socket. With the flashlight switch in the conventional off position, the flashlight batteries are connected in series with the ground terminal of the wall socket. In this configuration, a given one of the two bulbs will light in the event of a short circuit between ground and a given one of the two other nonground terminals. By switching to the on flashlight position, the battery is connected to one of the two nonground terminals, in which position a short circuit between said two nonground terminals would be indicated.

DESCRIPTION OF THE PREFERRED EMBODIMENT

Figure 1:
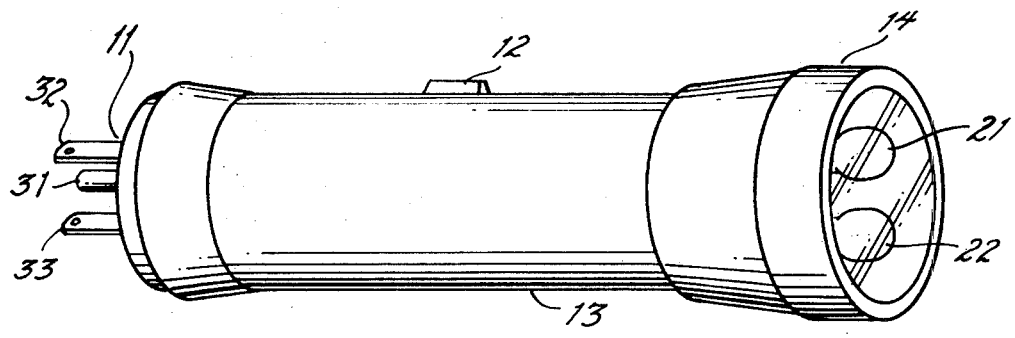
FIG. 1 shows a diagrammatic view of the flashlight short circuit testing device.

Referring now to the drawings, FIG. 1 shows a diagrammatic representation of the flashlight short circuit testing device. It is seen that the conventional flashlight has been adapted to receive two two-terminal bulbs 21 and 22, located in the head structure 14, and is equipped with a three-pronged adapter 11 at the rearward end. The three prongs of the adapter, 31, 32 and 33, are designed to fit a conventional wall socket having two energized terminals and a ground terminal. The switch 12 is a conventional flashlight switch, which can be located at any convenient position. It is to be noted that, when the apparatus of this invention is not plugged into any wall socket, it operates as a conventional flashlight, being switched from an off to on state by simple switching of the two-position switch 12. A case 13 of the conventional flashlight is shown, wherein the battery means 15 are contained.

Figure 2:
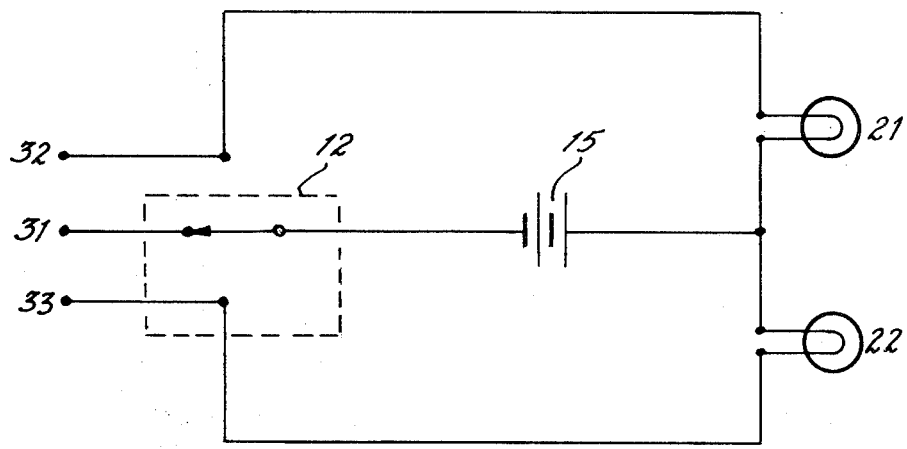
FIG. 2 shows a schematic diagram of the wiring of the flashlight short circuit testing device.

Referring now to FIG. 2, a circuit diagram is shown which indicates the manner of operation of this invention. In the preferred embodiment, a conventional sized flashlight is used, the battery means 15 being comprises of two batteries. The batteries are the only source of power for operating the apparatus of this invention. When used as a continuity tester, the wiring being tested is not connected to any power source, it being the purpose of this invention to make a continuity test prior to any power connection.

For use as a continuity tester, the device is plugged into a wall socket, whereby terminal 31 is connected to the grounded terminal of the installed wiring, and terminals 32 and 33 are connected to the black and white leads respectively, these being nonground terminals. When switch 12 is in the flashlight off position, one terminal of battery means 15 is connected to terminal 31, or the ground lead. In this circuit configuration, neither lamp will be energized in the absence of a short circuit, or continuity, between either terminal pair 31 and 32 or terminal pair 31 and 33. In the event of a short circuit between terminals 31 and 32, lamp 21 will be energized; in the event of a short circuit between 31 and 33, lamp 22 will be energized. When switch 12 is in the flashlight on position, contact is made from the switch to terminal 33. In this circuit configuration, lamp 22 will be lighted. In the event of a short circuit between terminals 33 and 32, lamp 21 will also be part of a closed circuit involving battery means 15, and consequently will also be lighted. The modes of operation of my invention are set forth in the following table:

| Switch position: | Short location | Bulb(s) lighted |
|---|---|---|
| 31 | 31–33 | 22 |
| 31 | 31–32 | 21 |
| 33 | 32–33 | 21, 22 |
| 33* | None | 22 |

*Apparatus operated as a flashlight only.

It is to be noted that although the preferred embodiment of this invention, as described above, incorporates a three-pronged adapter for use in three-terminal wall sockets, the invention can easily be adapted for use in two-terminal wall sockets, i.e., conventional sockets without a ground terminal. This may be accomplished by placing a conventional three-to-two pronged adapter onto the device shown in FIG. 1. Alternately, the three-pronged adapter as shown in FIG. 1 can be made detachable, screwing onto and off of the flashlight as does the normal cap at the rearward of a flashlight, allowing replacement with a two-pronged adapter.

While this invention has been described in the form of a specific embodiment, it is not limited thereby, as changes may be made in the configuration of the invention, and equivalents may be substituted, without departing from the spirit and scope of the invention as claimed.

I claim:

1. A flashlight short circuit testing apparatus, comprising:
   a. flashlight case means, incorporating a head structure;
   b. battery means, contained within said flashlight case means;
   c. lamp means, contained in said head structure, comprised of two two-terminal lamps;
   d. circuit means, connecting a first terminal of each said two lamps to a first terminal of said battery means at a common point, the second terminal of said battery means to a common switching point, the second terminal of the first of said lamps to a second output terminal, and the second terminal of the second of said lamps to a third output terminal;
   e. switching means, whereby said common switching point is switchable to said second output terminal and a first output terminal respectively;

f. adapter means attached to the rearward end of said case means for communication with a standard wall socket, having a plurality of prongs suitable for electrical connection with such a standard wall socket, each of said plurality of prongs being coupled to an output terminal of said circuit means.

2. The invention as described in claim 1, wherein said switching means is a conventional two-position switch.

3. The invention as claimed in claim 1, wherein said adapter means is a three-pronged adapter, suitable for electrical coupling with standard three-terminal wall sockets.

4. The invention as claimed in claim 1, wherein said adapter means is a two-pronged adapter, suitable for electrical coupling with conventional two-terminal wall sockets.